(12) United States Patent
Wells (10) Patent No.: US 6,408,387 B1
(45) Date of Patent: Jun. 18, 2002

(54) PREVENTING UNAUTHORIZED UPDATES TO A NON-VOLATILE MEMORY

(75) Inventor: Steve Wells, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/235,959

(22) Filed: Jan. 22, 1999

(51) Int. Cl.⁷ .................................................. G06F 9/00
(52) U.S. Cl. .......................................... 713/1; 713/100
(58) Field of Search ............................. 713/1, 2, 100, 713/200, 187, 188, 189, 191; 365/185.33

(56) References Cited

U.S. PATENT DOCUMENTS

| | | | |
|---|---|---|---|
| 4,525,599 A | * | 6/1985 | Curran et al. ................... 380/4 |
| 4,562,306 A | * | 12/1985 | Chou et al. ................... 713/200 |
| 4,694,412 A | | 9/1987 | Domenik et al. |
| 5,778,070 A | | 7/1998 | Mattison |
| 5,835,594 A | | 11/1998 | Albrecht et al. |
| 5,844,986 A | | 12/1998 | Davis |
| 6,026,016 A | | 2/2000 | Gafken |
| 6,028,445 A | * | 2/2000 | Lawman ....................... 326/38 |

OTHER PUBLICATIONS

Bruce Schneier, "Applied Cryptography, Second Edition: Protocols, Algorithms and Source Code in C", John Wiley & Sons, Inc., 1996, pp. vii–xiv, 369–395.

* cited by examiner

*Primary Examiner*—Dennis M. Butler
(74) *Attorney, Agent, or Firm*—Blakely, Sokoloff, Taylor & Zafman LLP (57) ABSTRACT

An apparatus and method for preventing unauthorized updates to a non-volatile memory. A sequence of encoded values is received in a non-volatile memory device and decoded by a decoding circuit in the non-volatile memory device to generate a sequence of decoded values. The sequence of decoded values is stored in the non-volatile memory device.

43 Claims, 6 Drawing Sheets

PREVENTING UNAUTHORIZED UPDATES TO A NON-VOLATILE MEMORY

FIELD OF THE INVENTION

The present invention relates to the field of memory management, and more particularly to securing updates to a non-volatile memory used to store program code.

BACKGROUND OF THE INVENTION

Many computer systems include a non-volatile memory to store basic input/output system (BIOS) program code. The BIOS code is usually the lowest layer of software in a computer system and acts as an interface between system hardware and higher-layer software. For example, the BIOS typically includes routines for managing system startup and for controlling various hardware components such as a wait-state generator, hardware timers, interrupt controllers and so forth.

Because BIOS routines interact extensively with system hardware, they are often invoked at a privilege level that allows unrestricted memory and I/O access. This makes the BIOS space (i.e., the memory space allocated to the BIOS) a particularly likely candidate for malicious attack. If unauthorized code (e.g., a computer virus) is substituted for BIOS code, the unauthorized code will likely be able to access a broad range of system devices that privilege-level protections would otherwise prevent. As a result, a successful attack on the BIOS space can result in considerable damage to a computer system, including the loss of sensitive information.

In modern computer systems, flash memory devices (e.g., flash electrically-erasable, programmable read-only memory (flash EEPROM)) are often used to store BIOS code. By sending the appropriate commands, flash devices can be erased and reprogrammed. While this makes it easier to install updated BIOS software, it also opens the door to malicious attack on the BIOS space. For example, some BIOS developers post updated BIOS code on sites of the World Wide Web ("the web") from which they can be downloaded and installed. One seeking to introduce unauthorized code into the BIOS space (i.e., an "attacker") could modify the posted BIOS code or even intercept and modify the code during download. Alternatively an attacker might masquerade as a legitimate BIOS developer to induce a computer user to download and install unauthenticated code. For example, the attacker could post unauthenticated code on a website and represent the code as being provided by a legitimate developer.

Figure 1:
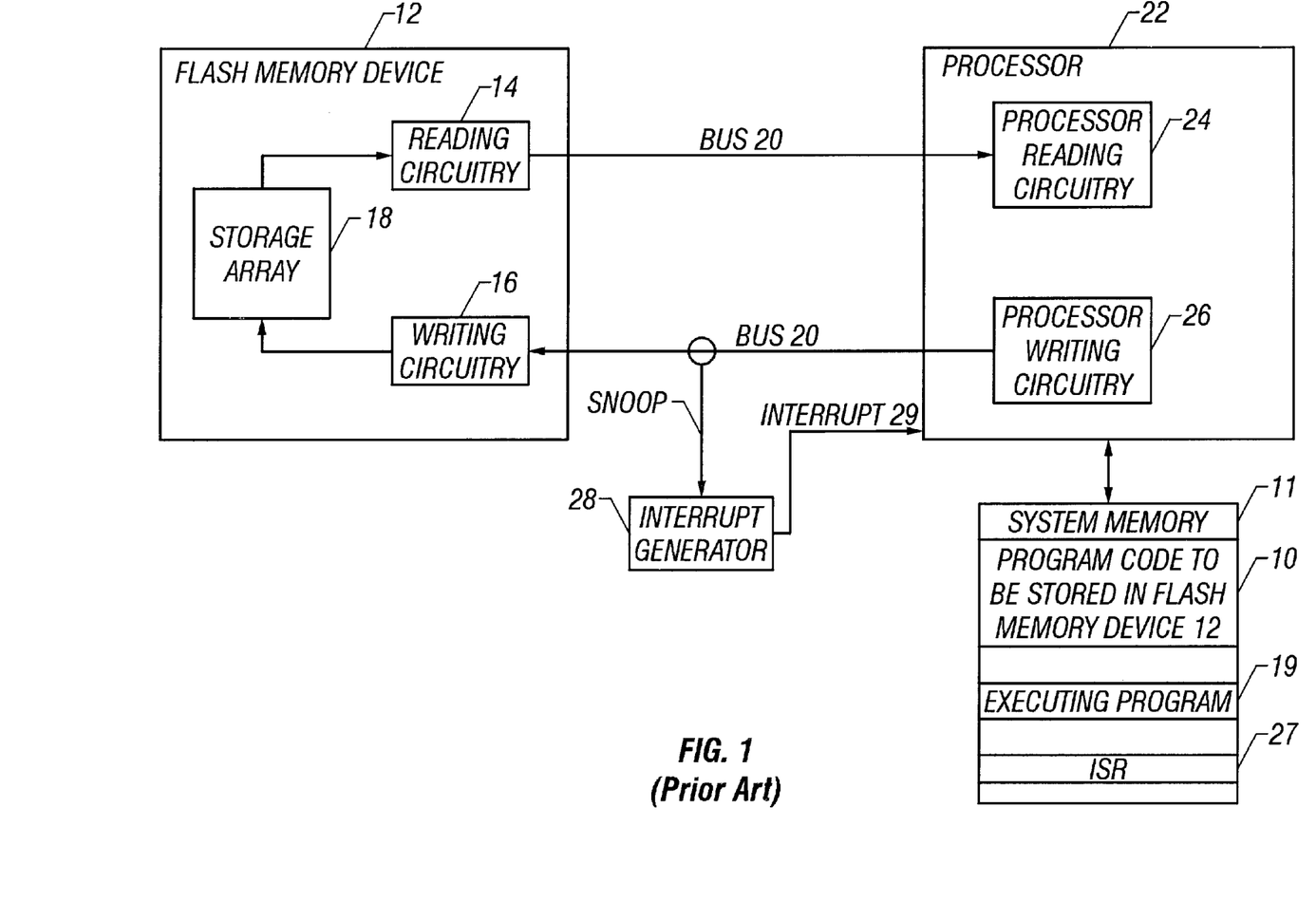
FIG. 1 is a data flow diagram that illustrates one prior-art technique for preventing unauthorized access to a BIOS space.

FIG. 1 is a data flow diagram that illustrates one prior-art technique for preventing unauthorized access to the BIOS space. Initially, program code 10 is obtained in a computer system that includes a processor 22, a system memory 11, an updatable, non-volatile memory device 12, a bus 20 and an interrupt generator 28. When a data transfer program 19 is executed, write circuitry 26 within the processor 22 transfers the program code 10 across bus 20 along with commands to the flash device 12 to write the program code into a predetermined space within storage array 18. The interrupt generator 28 snoops the signals transferred across the bus 20 and can therefore detect when a write access to the flash device 12 is being attempted. In response to detecting a write access attempt, the interrupt generator 28 asserts an interrupt 29 to interrupt the processor 22. In response to the interrupt, the processor 22 invokes an interrupt service routine 27 (typically stored in system memory 11) to validate the source of the data write, for example, by determining whether a predetermined value is present in the program code 10 (e.g., header or trailer information).

If the interrupt service routine (ISR) 27 determines that the attempted write access to the flash device 12 is valid, the ISR 27 is exited and transfer of the program code 10 is resumed. To prevent repeated interrupt generation after the initial validation operation, the interrupt generator 28 may be disabled until after the transfer is complete.

One disadvantage of the above-described technique is that it is relatively easy to circumvent. For example, the vector to the ISR 27 can be changed so that when the interrupt from the interrupt generator 28 is received, a substitute ISR is invoked. This substitute ISR may then disable the interrupt generator without validating the program code 10 that is attempting to write to the flash device 12. Unauthorized program code may then be written to the flash memory device 12. Alternatively, an attacker may access the code of ISR 27 to learn the authenticating value (or set of values) that is expected in the program code 10 and where the authenticating value is stored. The attacker can then store the authenticating value in unauthorized program code so that the ISR 27 erroneously validates the unauthorized program code. Again, the unauthorized program code may be written to the flash memory device 12.

SUMMARY OF THE INVENTION

An apparatus and method for preventing unauthorized updates to a non-volatile memory are disclosed. A sequence of encoded values is received in a non-volatile memory device. The sequence of encoded values is decoded in a decoding circuit in the non-volatile memory device to generate a sequence of decoded values and the sequence of decoded values is stored in the non-volatile memory device.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references similar elements and in which.

DETAILED DESCRIPTION

According to embodiments of the present invention, computer security is increased by writing pre-encoded program code to an enhanced-security, non-volatile memory device. Prior to publishing program code, a software developer encodes the program code using a predetermined encoding technique. When the published, encoded program code is obtained by a consumer and written to the enhanced-security, non-volatile memory device, a decoding circuit within the non-volatile memory device decodes the program code before it is stored in the device's non-volatile storage array. The decoded program code may then be fetched and executed in a conventional manner.

If an attacker attempts to transfer unauthorized, unencoded program code to the non-volatile memory device, the decoding circuit will garble the unauthorized code to prevent its execution. While this does not prevent overwriting of contents of the non-volatile memory, it does prevent the storage of program code which, if executed, could result in a loss of valuable or sensitive data. Thus, it is an intended advantage of the present invention to provide enhanced computer security by preventing unauthorized program code from being successfully stored in a non-volatile memory device. Other features and advantages of the present invention will be apparent from the following description and the accompanying drawings.

Figure 2:
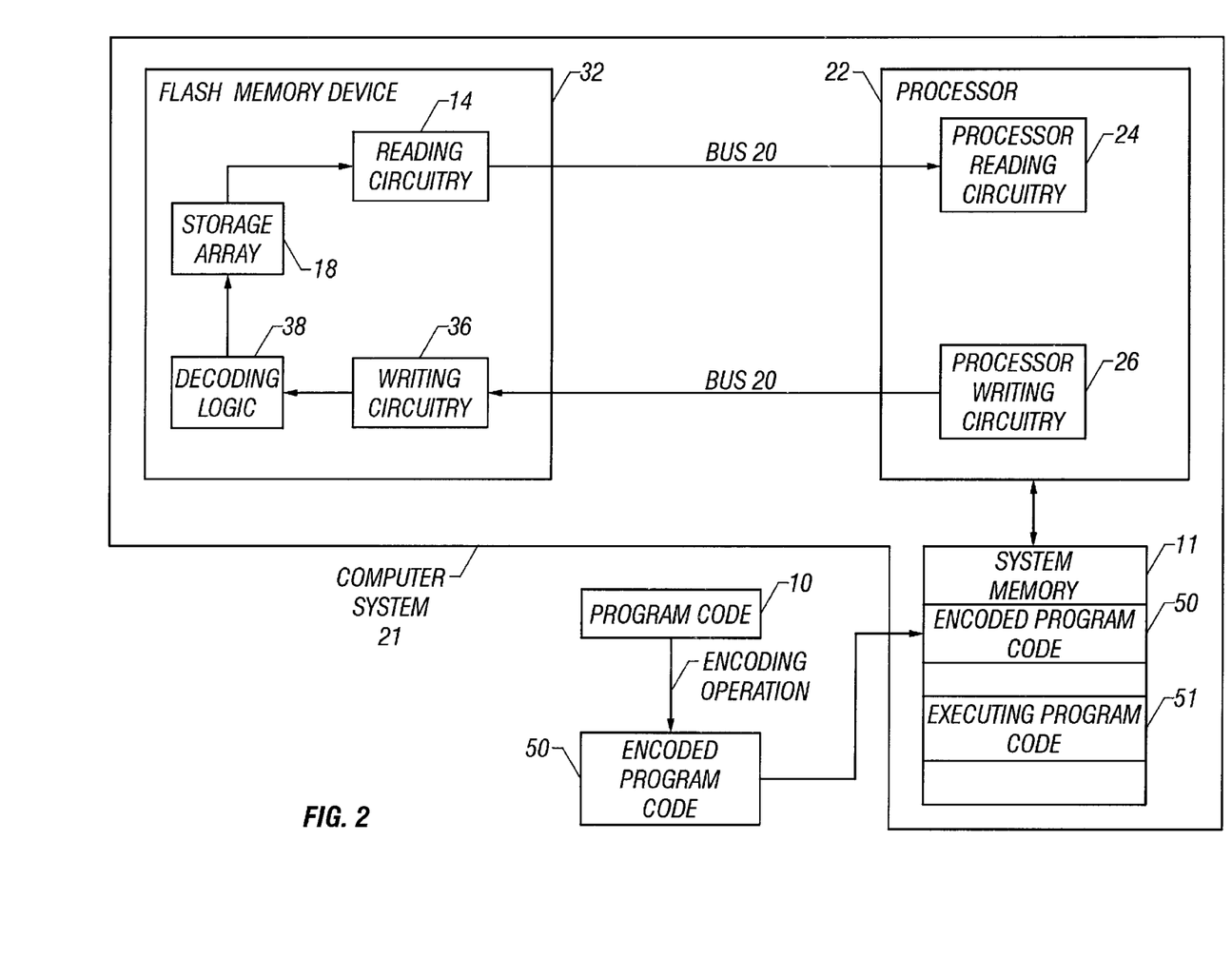
FIG. 2 is a data flow diagram that illustrates a method of updating contents of a non-volatile memory device according to one embodiment.

FIG. 2 is a data flow diagram that illustrates a method of updating contents of a non-volatile memory device according to one embodiment. Program code 10 is encoded according to a predetermined encoding technique and then published for distribution as encoded program code 50. As discussed below, any number of different encoding techniques may be used to generate the encoded program code 50. Also, because an important application of the present invention is to prevent the BIOS space from being written with unauthorized program code, the program code is occasionally referred to as BIOS code in the following description. Application of the present invention is not limited to securing BIOS code, however, and the program code may generally be any program code or data for which enhanced security is desired.

After the program code 10 has been encoded, the encoded program code 50 is transferred to a computer system 21 that includes a processor 22, a non-volatile memory device 32 a system memory 11 and a bus 20. The non-volatile memory device 32 is shown in FIG. 2 and described in the following description as a flash memory device, although any non-volatile memory device that can be erased and reprogrammed in-circuit may be used.

After the encoded program code 50 has been received in the computer system 21 (e.g., stored in the system memory 11), writing circuitry 26 in the processor 22 is used to transfer the encoded program code 50 to the flash memory device 32 via the bus 20. The encoded program code is transferred to the flash memory device 32 one word at a time in response to execution of program code 51. The word-size of each word transferred is determined by the width of the data portion of the bus 20 or by the software used to control the transfer 51, or both. In any case, the encoded program code 50 is received by the flash memory device 32 as a stream of data words.

In one embodiment, the flash device includes writing circuitry 36, reading circuitry 14, a storage array 18 and decoding logic 38. The writing circuitry 36 within the flash memory device 32 transfers the encoded program code 50 to decoding logic 38. The decoding logic 38 decodes the encoded program code 50 to recover the original program code 10. The decoded program code (i.e., recovered program code 10) is then stored in the storage array 18. Under software control, reading circuitry 24 within the processor 22 may fetch the decoded program code via the reading circuitry 14 in the flash memory device 32. The decoded program code may then be executed by the processor 22 in a conventional manner.

Figure 3:
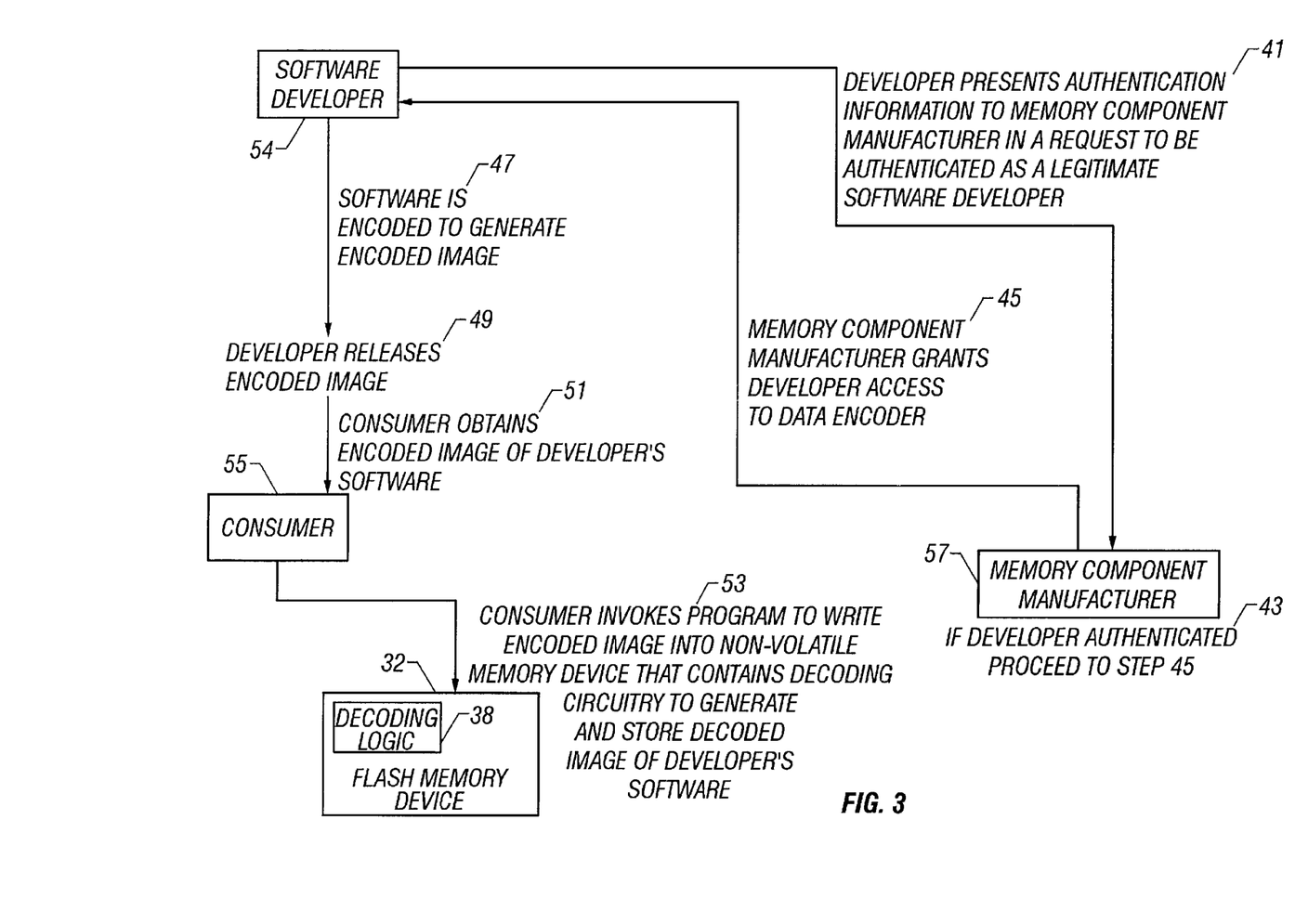
FIG. 3 diagrams one embodiment of a method for generating the encoded program code that restricts access to the encoding technique.

According to one embodiment, access to the technique for encoding program code is restricted to authenticated software developers to prevent unauthorized persons from circumventing the security mechanism described above. FIG. 3 diagrams one embodiment of a method for generating the encoded program code (e.g., encoded program code 50 of FIG. 2) that restricts access to the encoding technique to authenticated software developers. At step 41, a software developer 54 presents authentication information to a non-volatile memory component manufacturer 57 in a request to be authenticated as a legitimate software developer. The authentication information may include, but is not limited to, documents affirming the identity of the software developer, information obtained by visiting the software developer's site to assure its legitimacy and security procedures, and so forth. If the software developer 54 is authenticated at step 43, then the memory component manufacturer 57 grants the software developer 54 access to the encoding device or encoding computer program at step 45. According to one embodiment, the memory component manufacturer 57 grants access to the encoding device or program by encoding program code on behalf of the software developer 54. In this way, the memory component manufacturer 57 maintains possession of the encoding device or program, thus enhancing system security. In an alternate embodiment, the memory component manufacturer 57 may release the encoding device or program to the software developer 54 to allow the software developer 54 to perform the encoding operation.

At step 47, the program code is encoded into an encoded image (e.g., encoded program code 50 of FIG. 2) by the software developer 54 or by the memory component manufacturer 57 on the software developer's behalf. At step 49, the software developer 54 releases the encoded image for publication. At step 51, a consumer 55 obtains the encoded image of the software developer's program code, for example, by downloading the encoded image from a website or by purchasing a computer-readable medium having the encoded image stored thereon (e.g., CD-ROM or diskette) from a retailer. At step 53, the consumer 55 executes a program (e.g., program code 51 of FIG. 2) to transfer the encoded image to a non-volatile memory device 32 that contains decoding logic 38. The decoding logic 38 restores the encoded program code to its executable form so that the program code may be fetched and executed.

Figure 4:
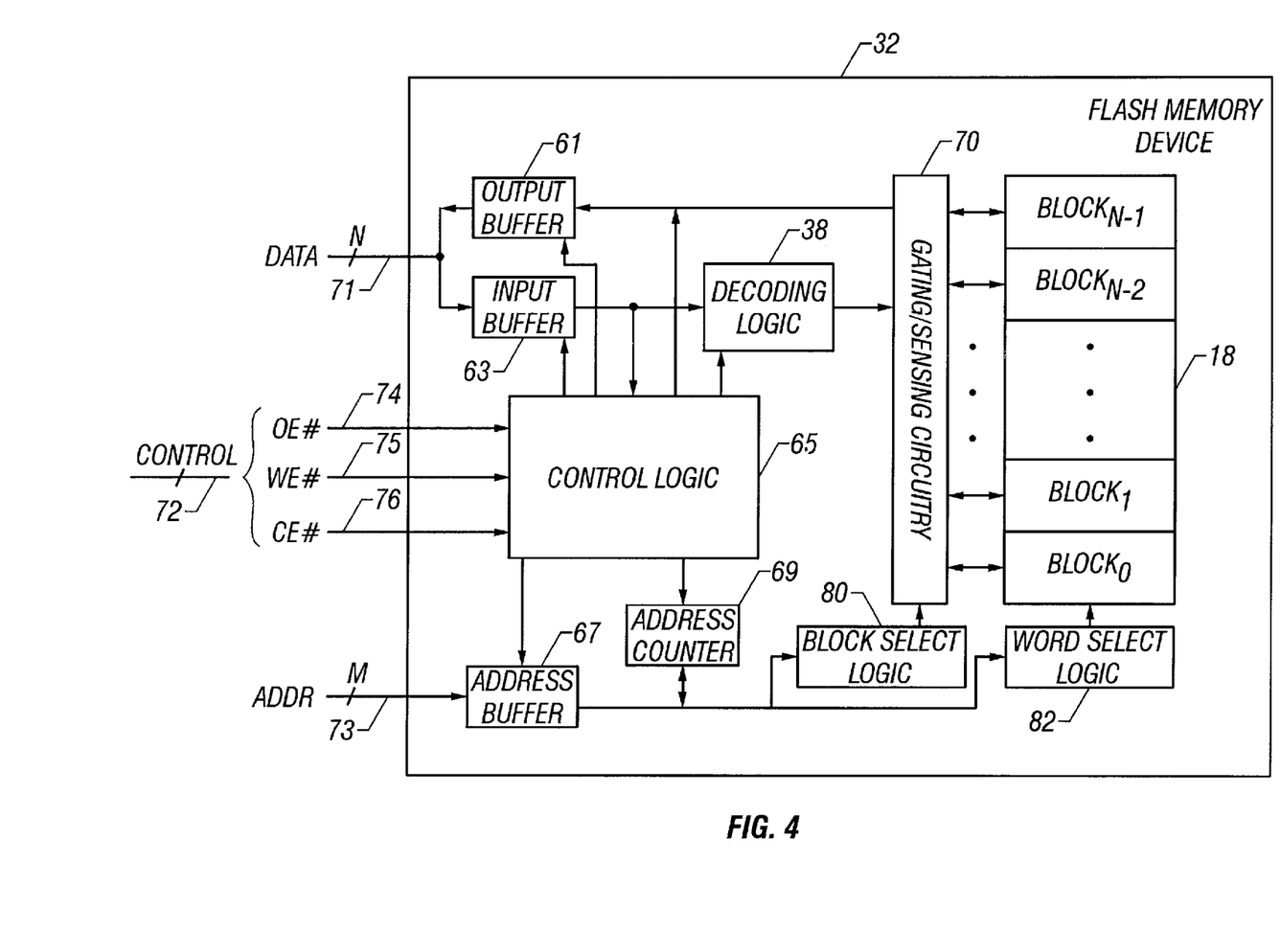
FIG. 4 is a diagram of a flash memory device according to one embodiment.

FIG. 4 is a diagram of a flash memory device 32 according to one embodiment. The flash memory device 32 includes input and output buffers 61 and 63, control logic 65, decoding logic 38, an address buffer 67, an address counter 69, block select logic 80, word select logic 82, gating/sensing circuitry 70 and a storage array 18 arranged in blocks 0 to N–1. The flash memory device 32 may include other components that are not shown (e.g., page buffers and page buffer control circuitry). The flash memory device 32 receives and outputs data on an N-bit wide data bus 71, receives addresses on an M-bit wide address bus 73 and receives control signals output enable 74, write enable 75 and chip enable 76 on a control bus 72. In one embodiment, the control bus 72, address bus 73 and data bus 71 are included in the bus 20 shown in FIG. 2.

The control logic 65 receives the output enable 74, write enable 75 and chip enable signals 76 and issues control signals to the output buffer 61, input buffer 63 and address buffer 67 in response. For example, when the write enable signal and the chip enable signals are asserted, the control logic 65 issues control signals to enable an input value from the data bus 71 into the input buffer 63 and an address from the address bus 73 into the address buffer 67. The input value is then delivered from the input buffer 63 to either the decoding logic 38 or the control logic 65 based on whether the input value is a command or data. For example, if a data transfer was completed in the preceding transfer cycle, the next input value may be assumed to be a command and is therefore delivered to the control logic. 65. Input values that are part of a commanded data transfer are delivered to the decoding logic 38 and then to the gating/sensing circuitry 70. The gating/sensing circuitry 70 programs (writes) each decoded value received from the decoding logic 38 in the storage array 18.

Assuming that a command to write a sequence of values (e.g., program code) has been received in the control logic 65, the control logic 65 will cause the address from the address buffer 67 to be stored in the address counter 69 and will then signal the address counter 69 to increment the address as each data value is written to the storage array 18. The block select logic 80 and word select logic 82 receive each incremental address from the address counter 69 and decode the address to select a block within the storage array 18 and a location within the selected block, respectively, at which a decoded data value is stored. The gating/sensing circuitry 70 is used to perform the actual programming (writing) and sensing (reading) operations. When a command is received to read data from the storage array 18, a value is output from the addressed location (as selected by the block select logic 80 and word select logic 82), amplified by the gating/sensing circuitry 70 and driven onto the data bus 71 by the output buffer 61, all under control of the control logic 65.

For each unit of program code received from the data bus 71 and buffered in the input buffer 63, the control logic 65 signals the decoding logic 38 to generate a new decoding value that is applied to decode the unit of program code. Each decoded program code value is supplied to the gating/sensing circuitry 70 which programs the decoded program code value into a respective storage location selected by the block select logic 80 and the word select logic 82.

The sequence of decoding values generated by the decoding logic 38 and applied to decode an incoming program code sequence is referred to as a keystream. A keystream is generated by a logic element called a keystream generator which may be implemented in software or by a wide variety of circuits.

Figure 5:
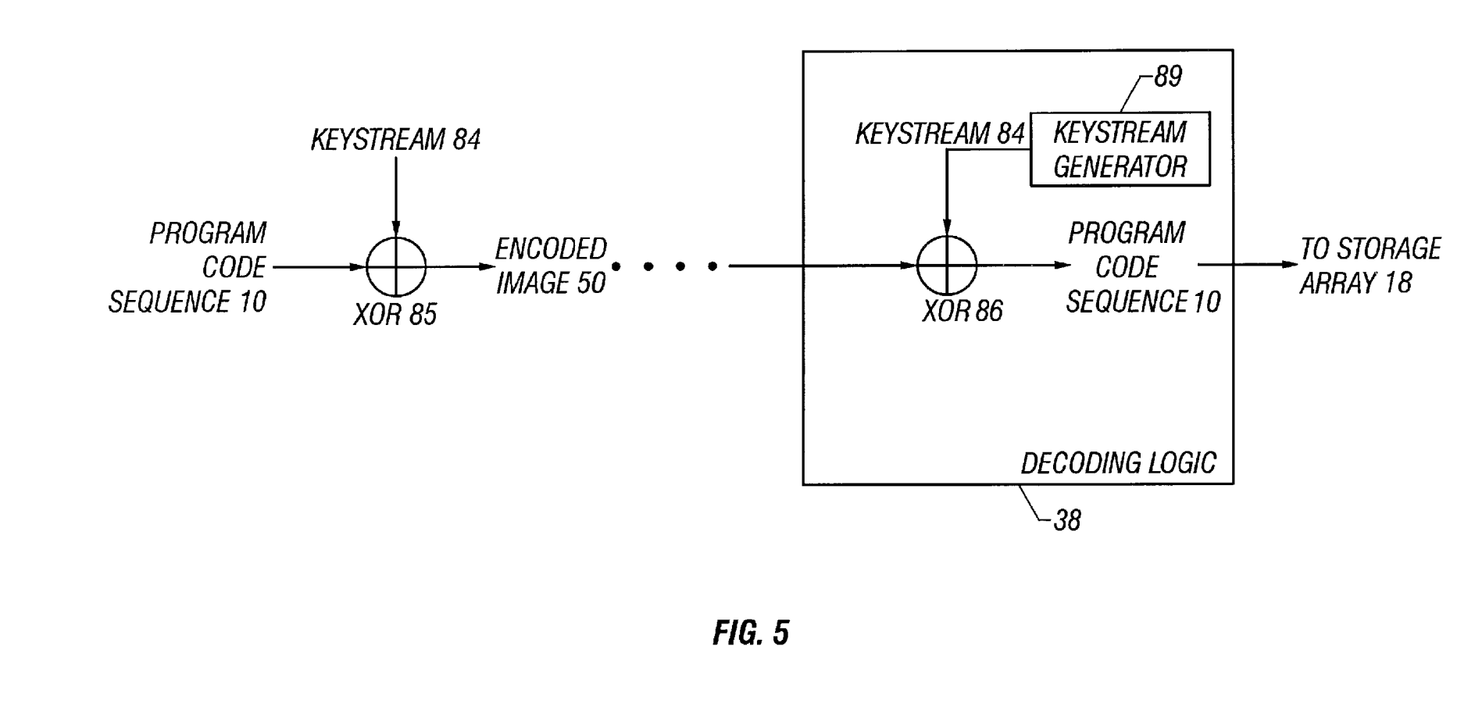
FIG. 5 is a diagram illustrating the components of a keystream-based encoding/decoding system according to one embodiment.

FIG. 5 is a diagram illustrating the components of a keystream-based encoding/decoding system according to one embodiment. As shown, a program code sequence 10 is exclusive-or'd (e.g., by exclusive-or gate 85) word-by-word with a keystream 84 to produce an encoded image 50. When the encoded image 50 is transferred to a non-volatile memory device that includes decoding logic 38 (e.g., the non-volatile memory device 32 of FIG. 4), a keystream generator 89 within the decoding logic 38 applies the same keystream 84 that was used to produce the encoded image 50 to the recover the original program code sequence 10. The following illustrates the logical equivalence between a code sequence that has been twice exclusively-or'd with the same keystream and the original code sequence:

(CODE XOR KEY) XOR KEY=
CODE XOR (KEY XOR KEY)=
CODE XOR 0=
CODE

According to one embodiment, the encoded image 50 is produced by executing a computer program to generate the keystream 84 and to XOR the individual keystream values with respective words of the program code sequence. Because the decoding logic is implemented in hardware, a circuit-based keystream generator 89 is used in one embodiment to generate the keystream 84 applied to decode the encoded image 50.

Figure 6:
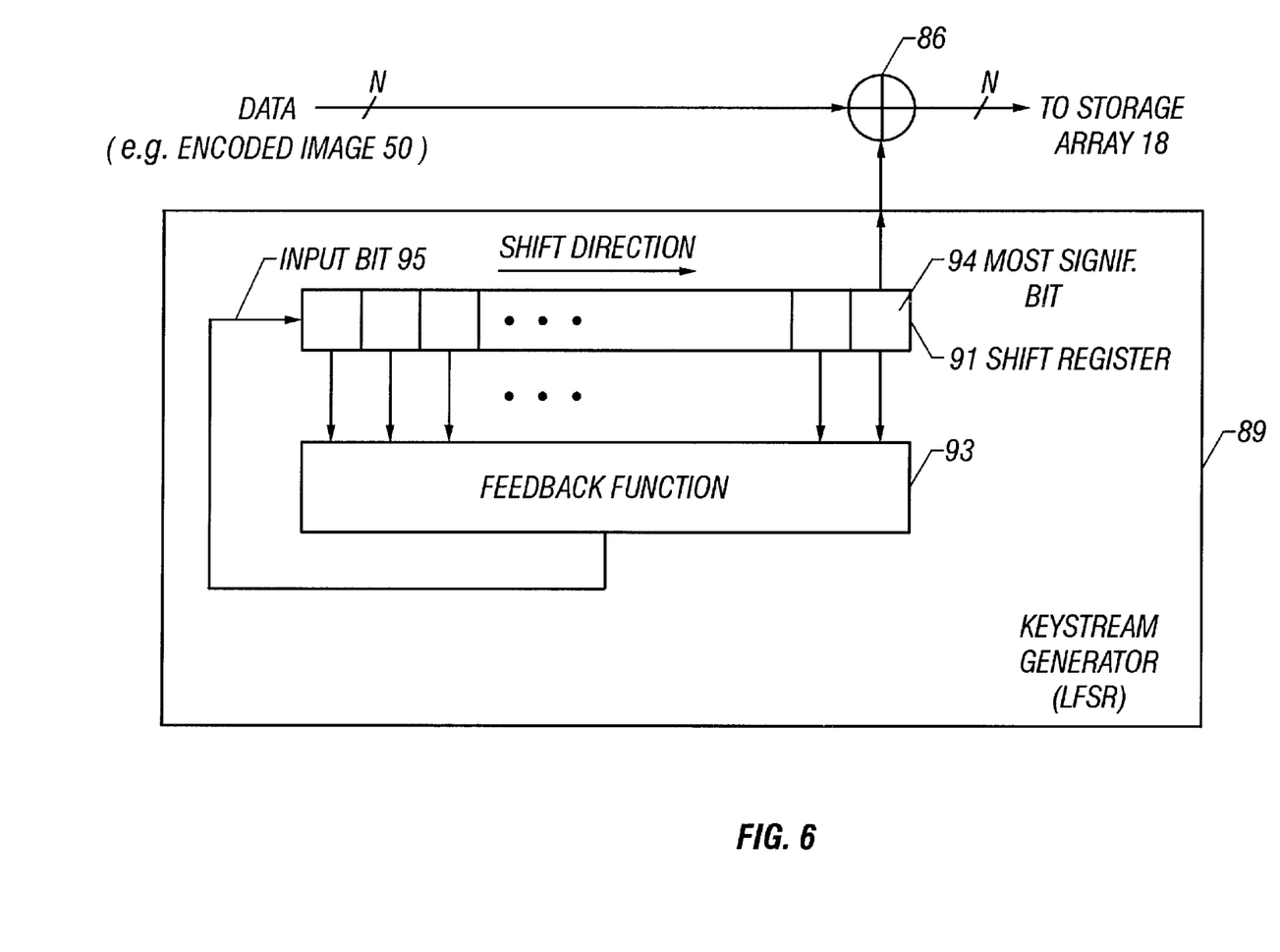
FIG. 6 depicts one embodiment of a keystream generator 89 that is used to decode an encoded image.

FIG. 6 depicts one embodiment of a keystream generator 89 that is used to decode an encoded image. The keystream generator 89 is one of a class of pseudo-random-sequence generators known as a linear feedback shift register (LFSR). The LFSR 89 includes two components: a shift register 91 and a feedback function 93. With each shifting of the shift register 91, a new most-significant bit 94 is output as part of the keystream, and an input bit 95 is inserted at the beginning of the shift register 91. In one embodiment, the shift register is shifted in response to a control signal (e.g., from control logic 65 of FIG. 4) that is asserted with each new program code value received. Other clocking sources may be used to shift the contents of shift register 91 in alternative embodiments.

The feedback function 93 is typically an exclusive-or combination of bits at selected bit positions of the shift register 91. These selected bit positions are referred to as taps. By appropriate selection of the taps, the LFSR 89 can be made to output a keystream that does not repeat until after $2^n-1$ key bits have been generated, n being the number of bits in the shift register 91. In alternate embodiments, other circuits may be used to generate the keystream, including, but not limited to, combinations of LFSRs in which the output of one or more LFSRs are logically combined, used to select between outputs of other LFSRs, used to clock other LFSRs, and so forth.

According to one embodiment, a single bitstream generated by a keystream generator 89 is applied to decode a sequence of program code values. A single bit output by the keystream generator 89 may be applied to each bit of a program code word so that a word filled with all 1's or all 0's would be used to decode each word of program code. This is shown in FIG. 6 by the exclusive-or combination (element 86) of the most significant bit of the shift register 91 with each of the N-bits of a word of incoming program code. Alternatively, the keystream generator may be clocked so that N bits of the keystream are generated and respectively applied to each of the N-bits of an encoded word of program code. For example, each of the bits in an N-shift register could be respectively applied to the N-bits of an encoded word of program code. The shift register would then be clocked (i.e., shifted) N times to generate a new N-bit keyword for application to the next word of program code.

In another embodiment, N separate bitstreams may be generated by a keystream generator to produce a keyword made up of N different key bits. This may be accomplished, for example by providing N differently designed LFSR circuits that operate in parallel to generate the N-bit keyword, or by providing N identically designed LFSR circuits that are seeded differently (e.g., the shift registers of the individual LFSRs may be initialized to different values).

According to yet another embodiment, a transfer protocol may be defined in which one or more predetermined values are appended to the beginning of a program code sequence to seed the LFSR circuits. When the seed value prefix is received in the non-volatile memory, the seed values act to initialize the keystream generator to a predetermined state before the output of the keystream generator is applied to the succeeding program values. Logic may be included in the decoding logic to suppress storage of the seed values in the non-volatile storage array or the starting address at which the program code is to be stored may be adjusted to account for storage of the seed values.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising:
   receiving encoded program code by a non-volatile memory device;
   decoding the received encoded program code by the non-volatile memory device; and
   storing the decoded program code in the non-volatile memory device.

2. The method of claim 1, wherein the receiving comprises receiving encoded basic input/output system (BIOS) program code.

3. The method of claim 1, comprising encoding program code to generate the encoded program code.

4. The method of claim 3, wherein the encoding comprises combining program code and a sequence of values.

5. The method of claim 4, wherein the combining comprises performing an exclusive-OR operation.

6. The method of claim 1, wherein the decoding comprises combining received encoded program code and a sequence of values.

7. The method of claim 6, wherein the combining comprises performing an exclusive-OR operation.

8. The method of claim 1, wherein the decoding comprises combining received encoded program code and a sequence of values used to generate the received encoded program code.

9. The method of claim 1, wherein the non-volatile memory device comprises an electrically erasable, programmable read-only memory (EEPROM) device.

10. The method of claim 1, wherein the non-volatile memory device comprises a flash electrically erasable, programmable read-only memory (EEPROM) device.

11. A method comprising:
    receiving a first sequence of values by a non-volatile memory device;
    decoding the received first sequence of values by the non-volatile memory device,
    wherein the decoding comprises combining the received first sequence of values and a second sequence of values; and
    storing the decoded first sequence of values in the non-volatile memory device.

12. The method of claim 11, wherein the combining comprises performing an exclusive-OR operation.

13. The method of claim 11, wherein the combining comprises combining the received first sequence of values and a second sequence of values used to generate the received first sequence of values.

14. A method comprising:
    receiving a sequence of values by an electrically erasable, programmable read-only memory (EEPROM) device;
    decoding the received sequence of values by the EEPROM device; and
    storing the decoded sequence of values in the EEPROM device.

15. The method of claim 14, wherein the EEPROM device comprises a flash EEPROM device.

16. An apparatus comprising:
    non-volatile storage elements;
    circuitry to decode encoded program code; and
    circuitry to store the decoded program code in the non-volatile storage elements.

17. The apparatus of claim 16, wherein the encoded program code comprises encoded basic input/output system (BIOS) program code.

18. The apparatus of claim 16, wherein the circuitry to decode comprises a sequence generator to generate a sequence of values and circuitry to combine the generated sequence of values and encoded program code.

19. The apparatus of claim 18, wherein the sequence generator comprises a pseudo-random sequence generator.

20. The apparatus of claim 18, wherein the circuitry to combine comprises an exclusive-OR gate.

21. The apparatus of claim 18, the sequence generator to generate a sequence of values used to generate the encoded program code.

22. The apparatus of claim 16, wherein the non-volatile storage elements comprise electrically erasable, programmable read-only memory (EEPROM) storage elements.

23. The apparatus of claim 16, wherein the non-volatile storage elements comprise flash electrically erasable, programmable read-only memory (EEPROM) storage elements.

24. An apparatus comprising:
    non-volatile storage elements;
    a sequence generator to generate a first sequence of values;
    circuitry to combine the generated first sequence of values and a second sequence of values to decode the second sequence of values; and
    circuitry to store the decoded second sequence of values in the non-volatile storage elements.

25. The apparatus of claim 24, wherein the sequence generator comprises a pseudo-random sequence generator.

26. The apparatus of claim 24, wherein the circuitry to combine comprises an exclusive-OR gate.

27. The apparatus of claim 24, the sequence generator to generate a first sequence of values used to encode the second sequence of values.

28. An apparatus comprising:
    electrically erasable, programmable read-only memory (EEPROM) storage elements;
    circuitry to decode a sequence of values; and
    circuitry to store the decoded sequence of values in the EEPROM storage elements.

29. The apparatus of claim 28, wherein the EEPROM storage elements comprise flash EEPROM storage elements.

30. A system comprising:
    a processor;
    a datapath coupled to the processor; and
    a non-volatile memory device coupled to the datapath, the non-volatile memory device comprising non-volatile storage elements, circuitry to decode encoded program code received from the processor, and circuitry to store the decoded program code in the non-volatile storage elements.

31. The system of claim 30, wherein the encoded program code comprises encoded basic input/output system (BIOS) program code.

32. The system of clam 30, wherein the circuitry to decode comprises a sequence generator to generate a sequence of values and circuitry to combine the generated sequence of values and encoded program code.

33. The system of claim 32, wherein the sequence generator comprises a pseudo-random sequence generator.

34. The system of claim 32, wherein the circuitry to combine comprises an exclusive-OR gate.

35. The system of claim 32, the sequence generator to generate a sequence of values used to generate the encoded program code.

36. The system of claim 30, wherein the non-volatile storage elements comprise electrically erasable, programmable read-only memory (EEPROM) storage elements.

37. The system of claim 30, wherein the non-volatile storage elements comprise flash electrically erasable, programmable read-only memory (EEPROM) storage elements.

38. A system comprising:

a processor;

a datapath coupled to the processor; and a non-volatile memory device coupled to the datapath, the non-volatile memory device comprising non-volatile storage elements, a sequence generator to generate a first sequence of values, circuitry to combine the generated first sequence of values and a second sequence of values received from the processor to decode the second sequence of values, and circuitry to store the decoded second sequence of values in the non-volatile storage elements.

39. The system of claim 38, wherein the sequence generator comprises a pseudo-random sequence generator.

40. The system of claim 38, wherein the circuitry to combine comprises an exclusive-OR gate.

41. The system of claim 38, the sequence generator to generate a first sequence of values used to encode the second sequence of values.

42. A system comprising:

a processor;

a datapath coupled to the processor; and an electrically erasable, programmable read-only memory (EEPROM) device coupled to the datapath, the EEPROM device comprising storage elements, circuitry to decode a sequence of values received from the processor, and circuitry to store the decoded sequence of values in the storage elements.

43. The system of claim 42, wherein the EEPROM device comprises a flash EEPROM device.

\* \* \* \* \*

UNITED STATES PATENT AND TRADEMARK OFFICE
CERTIFICATE OF CORRECTION

PATENT NO.     : 6,408,387 B1
DATED          : June 18, 2002
INVENTOR(S)    : Wells It is certified that error appears in the above-identified patent and that said Letters Patent is hereby corrected as shown below:

<u>Column 2,</u>
Line 43, after "references", insert -- indicate --.

Signed and Sealed this

Fourteenth Day of January, 2003

JAMES E. ROGAN
*Director of the United States Patent and Trademark Office*